Aug. 14, 1934.  H. C. WANNER  1,970,156
MOTOR VEHICLE ASSEMBLY
Filed Feb. 15, 1932
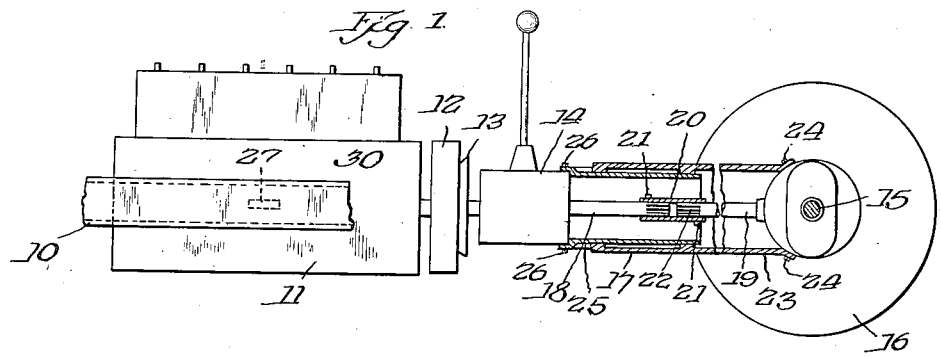
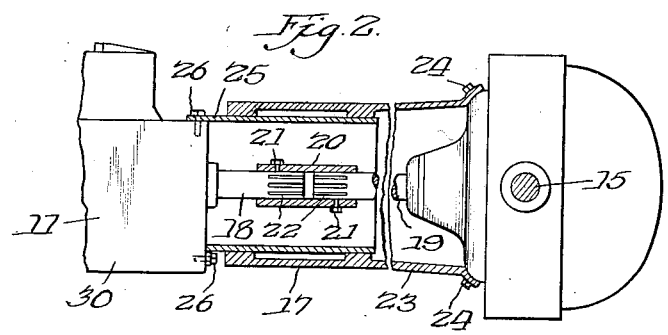
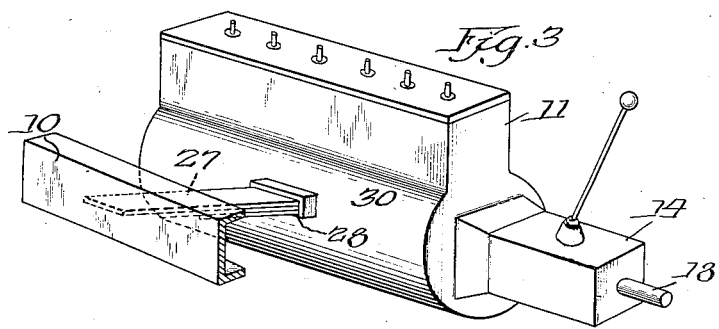
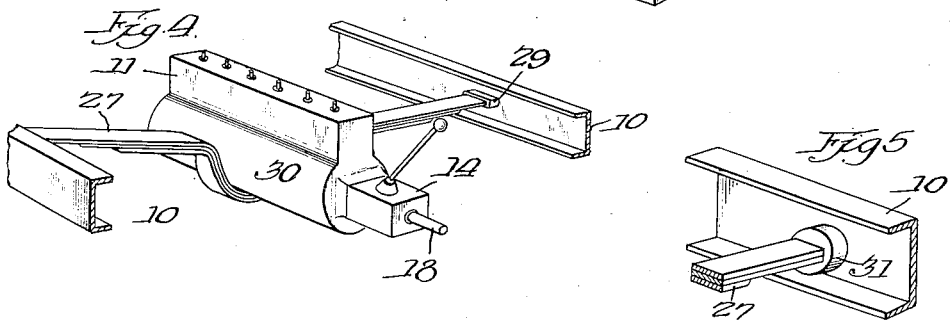
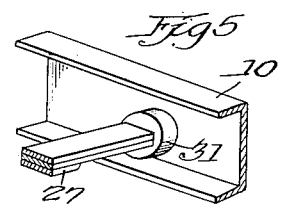
Inventor:
Harry C. Wanner
By James R. McKnight
Atty
Witness
P. B. Davison Patented Aug. 14, 1934

1,970,156

UNITED STATES PATENT OFFICE 1,970,156

MOTOR VEHICLE ASSEMBLY

Harry C. Wanner, Chicago, Ill.

Application February 15, 1932, Serial No. 592,893

2 Claims. (Cl. 180—57)

My invention relates to vehicles, including automobiles, and solves the problem of flexible mounting to reduce unsprung weight and therefore gives the proper distribution of tortion and strain so as to increase riding qualities.

Among the objects of my invention are the following: to create an assembly where the universal joint is eliminated and therefore a saving of consequent loss of power and the elimination of such wearing parts; to create an assembly wherein torsion, strain and unsprung weight are reduced; to provide the elimination of unsprung weight on the rear axle; to supply a vehicle with better riding qualities and increased traction ability; to provide a vehicle where driving shaft whip and vibration are greatly reduced; to create an assembly capable of fitting into a compact space thereby simplifying the assembly and making the parts more accessible for examination and general repair as where the assembly is substantially at the rear part of a vehicle, the body being substantially in front.

My invention further resides in the combination of parts shown in the accompanying drawing and while I have shown, therein, preferred embodiments, yet I wish it understood that these embodiments are merely illustrative of my invention, are susceptible of modification and change, without departing from the spirit of my invention.

Referring more particularly to the drawing:

Fig. 1 is a side view of my assembly; Fig. 2 is a detailed view of my resilient coupling members; Fig. 3 is a detailed view of one embodiment of my resilient mounting; Fig. 4 is another embodiment of my resilient mounting; Fig. 5 is a detailed view of the movable trunnion on the frame.

My invention, more in detail, comprises a frame (10) of a vehicle; an engine (11) with the usual fly-wheel (12); clutch (13); transmission mechanism (14); axle (15) and wheel (16). Although this combination of parts may be used, my invention may also have the following relation of parts: engine (11) clutch (13) axle (15) transmission (14), without changing the spirit of the invention. With either of these relationships of parts it will readily be seen that the universal joint is eliminated.

Between the transmission and the axle, or between the engine and axle, according to the way it is arranged, I employ a coupling (17), (one embodiment of which is more clearly shown in Fig. 2), this coupling (17) comprises more in detail a shaft (18) and a shaft (19). The shaft (18) may lead either from the transmission (14) or direct from the clutch (13); the shaft (19) leads from the axle (15). These two shafts (18 and 19) are rigidly connected by a collar (20) held by clamp means (21) and splines (22); an outer collar (23) is fixed to the axle by clamping means, or the like, (24); the inner collar (25) is fixed to the engine and transmission by suitable clamping means (26). These two collar means take up thrust and driving torque and are able to rotate for a limited distance within one another in either direction, thrust being force of pressure on a part and torque being rotational stress.

Referring more particularly to Fig. 3, the resilient mounting (27) extends from the frame (10) to the side of the crank case (30) where it is held in a pocket (28). Although this pocket (28) may be fixed in the crank case (30), it may also be adjusted higher in relation to the engine.

Fig. 4 shows another embodiment of this resilient member extending from the frame (10) where it is held in the pocket (29) and continuing under the crank case (30). This construction uses the resilient member as a support so that the crank case (30) rests on the resilient member. In Fig. 5 a trunnion (31) instead of a pocket (29) may be employed so as to give greater cradling and allow rotation of the resilient member. While the resilient member may be a leaf spring yet any suitable equivalent may be employed.

In placing the resilient member it is desirable to attach said resilient member to that part of the motor or under that part of the motor which will allow a balance or distribution of weight most suitable for the particular vehicle. Practice has shown at 60%, (or at least some greater degree than 50%) of weight being forward of the point of attachment and 40% behind that point creates a condition where the dead load carried upon the wheels is less than the dead weight of the axle. The resilient member or members are fastened to said motor at a point so located that over 50% of the weight of the motor is forward and away from the rear axle and less than 50% of the weight of the motor is to the rear of the point of attachment and toward the rear axle, the point of attachment to the frame being less than half way from the rear axle to the front axle.

Having thus described my invention, I claim:

1. In a motor vehicle assembly, a plurality of wheels, a chassis frame supported by said wheels, an engine, a rear axle mounting said wheels, a shaft forming a driving connection between said engine and said rear axle without any universal joint between them, a longitudinally adjustable tube rigidly attached to the engine and the rear axle and giving rigidity in a transverse direction and transverse springs mounting the engine directly to the frame, said springs being connected to said engine at a point rearwardly of the longitudinal center.

2. In a motor vehicle assembly a plurality of wheels, a chassis frame supported by said wheels, an engine, a rear axle mounting said wheels, a shaft forming a driving connection between said engine and said rear axle without any universal joint between them, an inner collar rigidly attached to the engine, an outer collar rigidly attached to the rear axle, said collars being telescoped and adapted to oppose torque reaction of the axle, and transverse springs mounting the engine directly to the frame, said springs being connected to said engine at a point rearwardly of the longitudinal center.

HARRY C. WANNER.